United States Patent
Moore

(10) Patent No.: US 7,436,184 B2
(45) Date of Patent: Oct. 14, 2008

(54) WELL LOGGING APPARATUS FOR OBTAINING AZIMUTHALLY SENSITIVE FORMATION RESISTIVITY MEASUREMENTS

(75) Inventor: Robert A Moore, Katy, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 213 days.

(21) Appl. No.: 11/080,777

(22) Filed: Mar. 15, 2005

(65) Prior Publication Data
US 2006/0208738 A1 Sep. 21, 2006

(51) Int. Cl.
G01V 3/08 (2006.01)
E21B 31/06 (2006.01)

(52) U.S. Cl. ............ 324/347; 166/66.5; 324/338; 324/355

(58) Field of Classification Search ......... 324/338–358, 324/369, 366, 333, 368; 166/66.5; 702/6, 702/7, 9; 367/25, 82; 175/50, 406
See application file for complete search history.

(56) References Cited

U.S. PATENT DOCUMENTS

| | | | |
|---|---|---|---|
| 3,305,771 A | 2/1967 | Arps | |
| 3,377,549 A | 4/1968 | Newman et al. | |
| 3,408,561 A | 10/1968 | Redwine et al. | |
| 3,488,574 A | 1/1970 | Tanguy | |
| 4,468,623 A | 8/1984 | Gianzero et al. | |
| 4,652,829 A | 3/1987 | Safinya | |
| 4,720,681 A | 1/1988 | Sinclair | |
| 4,766,442 A * | 8/1988 | Issenmann | 343/719 |
| 4,786,784 A | 11/1988 | Nikodem et al. | |
| 4,786,874 A | 11/1988 | Grosso et al. | |
| 4,845,433 A | 7/1989 | Kleinberg et al. | |
| 4,873,488 A | 10/1989 | Barber et al. | |
| 4,940,943 A | 7/1990 | Bartel et al. | |
| 5,023,450 A | 6/1991 | Gold | |
| 5,045,795 A | 9/1991 | Gianzero et al. | |
| 5,200,705 A | 4/1993 | Clark et al. | |
| 5,233,522 A | 8/1993 | Sinclair | |
| 5,235,285 A | 8/1993 | Clark et al. | |
| 5,260,662 A | 11/1993 | Rorden | |
| 5,291,137 A | 3/1994 | Freedman | |
| 5,331,331 A | 7/1994 | Wu | |
| 5,339,036 A | 8/1994 | Clark et al. | |
| 5,339,037 A | 8/1994 | Bonner et al. | |
| 5,357,797 A | 10/1994 | Maki, Jr. et al. | |
| 5,359,324 A | 10/1994 | Clark et al. | |
| 5,381,092 A | 1/1995 | Freedman | |
| 5,453,693 A | 9/1995 | Sinclair et al. | |
| 5,463,319 A | 10/1995 | Chesnutt et al. | |
| 5,463,320 A | 10/1995 | Bonner et al. | |
| 5,467,832 A | 11/1995 | Orban et al. | |
| 5,473,158 A | 12/1995 | Holenka et al. | |
| 5,486,695 A | 1/1996 | Schultz et al. | |
| 5,491,488 A | 2/1996 | Wu | |

(Continued)

*Primary Examiner*—Reena Aurora

(57) ABSTRACT

An apparatus for making azimuthally sensitive resistivity measurements of a subterranean formation is disclosed. The apparatus includes a magnetically permeably ring deployed about an electrically conductive tool body. An AC voltage supply is coupled to the tool body on opposing sides of the magnetically permeable ring, with at least one connecting conductor crossing outside the ring. Exemplary embodiments of this invention may further include one or more current sensing electrodes deployed in and electrically isolated from an outer surface of the tool body and may be utilized to make azimuthally resolved formation resistivity measurements.

27 Claims, 4 Drawing Sheets

U.S. PATENT DOCUMENTS

| | | | |
|---|---|---|---|
| 5,519,318 A | 5/1996 | Koerner et al. | |
| 5,519,668 A | 5/1996 | Montaron | |
| 5,530,358 A | 6/1996 | Wisler et al. | |
| 5,563,512 A | 10/1996 | Mumby | |
| 5,591,967 A | 1/1997 | Moake | |
| 5,661,402 A | 8/1997 | Chesnutt et al. | |
| 5,675,488 A | 10/1997 | McElhinney | |
| 5,850,624 A | 12/1998 | Gard et al. | |
| 5,867,806 A | 2/1999 | Strickland et al. | |
| 5,892,460 A | 4/1999 | Jerabek et al. | |
| 5,899,958 A | 5/1999 | Dowell et al. | |
| 5,953,683 A | 9/1999 | Hansen et al. | |
| 5,966,013 A | 10/1999 | Hagiwara | |
| 6,023,168 A | 2/2000 | Minerbo | |
| 6,037,776 A | 3/2000 | McGlone | |
| 6,064,210 A | 5/2000 | Sinclair | |
| 6,100,696 A | 8/2000 | Sinclair | |
| 6,131,694 A | 10/2000 | Robbins et al. | |
| 6,166,539 A | 12/2000 | Dahlberg et al. | |
| 6,167,348 A | 12/2000 | Cannon | |
| 6,191,586 B1 | 2/2001 | Bittar | |
| 6,191,588 B1 | 2/2001 | Chen | |
| 6,211,678 B1 | 4/2001 | Hagiwara | |
| 6,216,090 B1 | 4/2001 | Hagiwara | |
| 6,218,842 B1 | 4/2001 | Bittar et al. | |
| 6,272,232 B1 | 8/2001 | Delhomme et al. | |
| 6,297,631 B1 | 10/2001 | Ozue et al. | |
| 6,321,456 B1 | 11/2001 | McElhinnney | |
| 6,359,438 B1 | 3/2002 | Bittar | |
| 6,373,254 B1 | 4/2002 | Dion et al. | |
| 6,377,050 B1 | 4/2002 | Chemali et al. | |
| 6,400,149 B1 * | 6/2002 | Luong et al. | 324/303 |
| 6,405,136 B1 | 6/2002 | Li et al. | |
| 6,480,000 B1 | 11/2002 | Kong et al. | |
| 6,509,738 B1 | 1/2003 | Minerbo et al. | |
| 6,518,756 B1 | 2/2003 | Morys et al. | |
| 6,523,271 B2 | 2/2003 | Kato | |
| 6,531,868 B2 | 3/2003 | Prammer | |
| 6,534,986 B2 | 3/2003 | Nichols | |
| 6,536,123 B2 | 3/2003 | Tamura | |
| 6,539,639 B2 | 4/2003 | Smith | |
| 6,541,979 B2 | 4/2003 | Omeragic | |
| 6,543,146 B2 | 4/2003 | Smith et al. | |
| 6,556,014 B1 | 4/2003 | Kong et al. | |
| 6,573,722 B2 | 6/2003 | Rosthal et al. | |
| 6,600,321 B2 | 7/2003 | Evans | |
| 6,624,634 B2 | 9/2003 | Rosthal et al. | |
| 6,625,517 B1 | 9/2003 | Bogdanov et al. | |
| 6,633,164 B2 | 10/2003 | Vinegar et al. | |
| 6,633,236 B2 | 10/2003 | Vinegar et al. | |
| 6,633,816 B2 | 10/2003 | Shirasaka et al. | |
| 6,642,714 B2 | 11/2003 | Kobayashi et al. | |
| 6,646,441 B2 | 11/2003 | Thompson et al. | |
| 6,651,496 B2 | 11/2003 | Van Steenwyk et al. | |
| 6,662,875 B2 * | 12/2003 | Bass et al. | 166/369 |
| 6,679,332 B2 | 1/2004 | Vinegar et al. | |
| 6,680,613 B2 | 1/2004 | Rosthal et al. | |
| 6,684,952 B2 | 2/2004 | Brockman et al. | |
| 6,693,430 B2 | 2/2004 | Rosthal et al. | |
| 6,704,436 B1 | 3/2004 | Anxionnaz et al. | |
| 6,710,601 B2 | 3/2004 | Rosthal et al. | |
| 6,714,014 B2 | 3/2004 | Evans et al. | |
| 6,715,550 B2 | 4/2004 | Vinegar et al. | |
| 6,717,404 B2 | 4/2004 | Prammer | |
| 6,724,192 B1 | 4/2004 | McGlone | |
| 6,747,569 B2 | 6/2004 | Hill et al. | |
| 6,758,277 B2 | 7/2004 | Vinegar et al. | |
| 6,768,957 B2 | 7/2004 | Kato | |
| 6,816,788 B2 | 11/2004 | Van Steenwyk et al. | |
| 6,826,842 B2 | 12/2004 | Abe et al. | |
| 6,833,706 B2 | 12/2004 | Niina | |
| 6,843,318 B2 | 1/2005 | Yarbro | |
| 2002/0105332 A1 | 8/2002 | Rosthal et al. | |
| 2003/0042016 A1 | 3/2003 | Vinegar et al. | |
| 2003/0048697 A1 | 3/2003 | Hirsch et al. | |
| 2003/0066671 A1 | 4/2003 | Vinegar et al. | |
| 2003/0146751 A1 | 8/2003 | Rosthal et al. | |
| 2003/0146753 A1 | 8/2003 | Rosthal et al. | |
| 2003/0155924 A1 | 8/2003 | Rosthal et al. | |
| 2003/0184299 A1 | 10/2003 | Strack | |
| 2003/0184303 A1 | 10/2003 | Homan et al. | |
| 2003/0227393 A1 | 12/2003 | Vinegar et al. | |
| 2004/0079524 A1 | 4/2004 | Bass et al. | |
| 2004/0079526 A1 | 4/2004 | Cairns et al. | |
| 2004/0144530 A1 | 7/2004 | Bass et al. | |
| 2004/0222019 A1 | 11/2004 | Estes et al. | |

* cited by examiner

WELL LOGGING APPARATUS FOR OBTAINING AZIMUTHALLY SENSITIVE FORMATION RESISTIVITY MEASUREMENTS

BACKGROUND OF THE INVENTION

The use of electrical measurements in prior art downhole applications, such as logging while drilling (LWD), measurement while drilling (MWD), and wireline logging applications is well known. One such electrical measurement technique is utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Any references to the determination or use of resistivity in this application are intended to generically include conductivity as well. Those of ordinary skill in the art will readily recognize that these quantities are reciprocals and that one may be converted to the other via simple mathematical calculations. Mention of one or the other herein is for convenience of description, and is not intended in a limiting sense.

Prior art logging while drilling tools utilized to measure formation resistivity, typically utilize one or more wound toroidal core antennas (also referred to as toroidal transmitters and toroidal receivers) deployed in an insulating media along the exterior of the drill collar. As generally described in the prior art, the wound toroidal core antenna induces an electrical current in the drill collar. The electrical current enters the formation on one side of the toroidal transmitter and returns to the drill collar on the other side of the toroidal transmitter. Measurement of the current enables a formation resistivity to be determined.

For example, Redwine et al., in U.S. Pat. No. 3,408,561, disclose an LWD apparatus in which a toroidal receiver is deployed about a drill collar near the drill bit and a toroidal transmitter is deployed about the drill collar uphole of the toroidal receiver. In use, the voltage induced in the toroidal receiver provides an indication of the resistivity of the formation. Aarps, in U.S. Pat. No. 3,305,771, discloses a similar apparatus, but including a pair of toroidal transmitters and a pair of toroidal receivers.

Clark et al., in U.S. Pat. No. 5,235,285, disclose a technique intended to provide vertically and azimuthally resolved resistivity at multiple depths of investigation. An LWD tool including a tubular drill collar having longitudinally spaced first and second wound toroidal core antennas is utilized. The upper antenna is configured as a transmitter while the lower antenna is configured as a receiver. The tool further includes three longitudinally spaced button electrodes deployed in the drill collar between the wound toroidal core antennas. The button electrodes are intended to provide a return path for electrical current flow from the formation to the drill collar, with the current in the button electrodes being measured to determine a lateral resistivity of the regions of the formation opposing the electrodes. The longitudinal spacing of the button electrodes is intended to provide vertically resolved resistivity at multiple depths of investigation. Clark et al. further disclose rotating the drill collar to obtain azimuthally resolved resistivity.

The above described prior art resistivity tools are similar in that each includes two or more wound toroidal core antennas (one configured as a transmitter and the other configured as a receiver) deployed about a drill collar. These antennas create inductive impedances along the otherwise highly conductive drill collar. It is also known in the art to use such inductance in impede the unwanted flow of electrical current into other sections of the drill string or bottom hole assembly. For example, in one such device, magnetically permeable rings are deployed about an electrically conductive drill collar. The rings are positioned below a resistivity tool having wound toroidal antennas, and thus increase the electrical impedance between the resistivity tool and the adjacent bottom hole assembly. A protective, fiberglass sleeve may be deployed around the magnetically permeable rings to reduce the risk of mechanical damage to the rings. This type of device is sometimes referred to as an inductive choke.

While prior art LWD resistivity tools have been used successfully in commercial drilling applications, utilization of a multiple turn toroidal transformer is often problematic. A typical wound toroidal core antenna has a primary winding including many turns of insulated wiring about a toroidal core. Construction and protection of the relatively large toroidal core (e.g., typically having a diameter in the range of 4 to 10 inches) and winding are problematic, especially for use in the demanding downhole environment associated with geophysical drilling. Wound toroidal core antennas utilized in drilling applications are subject to high temperatures (e.g., as high as 200 degrees C.) and pressures (e.g., as high as 15,000 psi) as well as various (often severe) mechanical forces, including, for example, shocks and vibrations up to about 650 G per millisecond. Mechanical abrasion from cuttings in the drilling fluid and direct hits on the antenna (e.g., from drill string collisions with the borehole wall) have been known to damage wound toroidal core antennas. Moreover, it is typically expensive to fabricate and maintain wound toroidal core antennas capable of withstanding the above described downhole environment.

Therefore, there exists a need for an improved apparatus for making azimuthally sensitive resistivity measurements of a subterranean formation. In particular, an apparatus not requiring a wound toroidal core antenna may be potentially advantageous for making such azimuthally sensitive resistivity measurements in LWD applications.

SUMMARY OF THE INVENTION

The present invention addresses one or more of the above-described drawbacks of prior art techniques for making azimuthally sensitive resistivity measurements of a subterranean formation. Embodiments of this invention include at least one magnetically permeable ring deployed about an electrically conductive tool body. The tool body is configured for coupling with a drill string. An AC voltage supply is coupled to the tool body on opposing sides of the magnetically permeable ring, with at least one connecting conductor crossing outside the ring. The magnetically permeable ring decreases the admittance of the tool body (i.e., increases the resistance to flow of alternating current) such that an AC voltage difference may be sustained between the opposing sides of the tool body. Exemplary embodiments of this invention may further include one or more current sensing electrodes deployed in and electrically isolated from an outer surface of the tool body. In such exemplary embodiments, azimuthally sensitive formation resistivity may be determined via measurement of the AC current in the electrode(s). Rotation of the tool in the borehole and measurement of the azimuth via a conventional azimuth sensor enables one to determine the azimuthal variation of formation resistivity.

Exemplary embodiments of the present invention may advantageously provide several technical advantages. For example, embodiments of this invention do not require the use of a toroidal transmitter or a toroidal receiver deployed about the tool body. Rather, the combination of the AC voltage supply coupled directly to the tool body and the magnetically permeable ring(s) function as a transmitter. As such, exemplary embodiments of this invention may provide for improved reliability at reduced costs as compared to prior art azimuthal resistivity tools.

In one aspect the present invention includes a logging while drilling resistivity tool. The tool includes a substantially cylindrical, electrically conductive tool body including first and second longitudinally opposed ends. The tool body is disposed to be operatively coupled with a drill string and deployed in a subterranean borehole such that the logging while drilling tool may acquire resistivity measurements without removing the drill string from the borehole. The tool also includes at least one magnetically permeable ring deployed about the tool body between the first and second longitudinally opposed ends and an AC voltage supply electrically connected to the first and second ends of the tool body. At least one connecting conductor is deployed exterior to an outer surface of the magnetically permeable ring. The tool also includes a receiver.

In another aspect, this invention includes a logging while drilling tool including a substantially cylindrical, electrically conductive tool body including first and second longitudinally opposed ends. The tool also includes at least one magnetically permeable ring deployed about the tool body between the first and second longitudinally opposed ends and an electrically conductive, rigid sleeve deployed about the magnetically permeable ring. The tool further includes an AC voltage supply electrically connected to the first end of the tool body and the sleeve. At least one electrode is deployed in an outer surface of the tool body and a current measurement module is disposed to measure electrical current in the electrode.

In still another aspect this invention includes a downhole tool. The downhole hole tool includes a substantially cylindrical, electrically conductive tool body including first and second longitudinally opposed ends. The tool body further includes a blade deployed thereon, the blade being configured to extend outward from the tool body. At least one magnetically permeable ring is deployed about the tool body between the first and second longitudinally opposed ends, and an AC voltage supply is electrically connected to the first and second ends of the tool body. The downhole tool further includes at least one current sensing electrode deployed in an outer surface of the blade.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
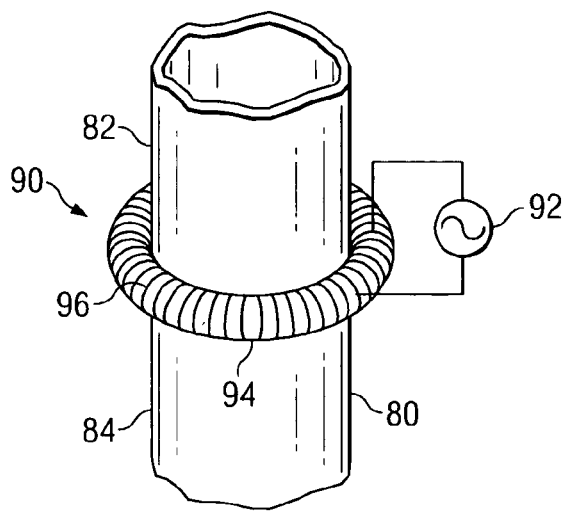
FIG. 1A is a schematic representation of a portion of a prior art downhole tool having a toroidal transformer deployed about a drill collar.

FIG. 1A schematically illustrates a wound toroidal core antenna 90 deployed about a drill collar 80 as utilized in various prior art downhole resistivity measurement tools. In a typical prior art apparatus, the wound toroidal core antenna 90 includes a toroidal core 94 having multiple windings (N-turns) of insulated wire 96 wrapped thereabout. An AC voltage supply 92 is coupled to the ends of the insulated wire 96. AC current passing through the windings induces a magnetic field in the toroidal core 94 circumferentially about the drill collar 80. The circumferential magnetic field further induces an AC potential difference in the drill collar 80 such that there is a potential difference between upper 82 and lower 84 sides thereof. It will be appreciated that terms used in this disclosure such as "upper" and "lower" are intended merely to show relative positional relationships in the described exemplary embodiments and are not limiting of the invention in any way. As described briefly above in the Background Section of this disclosure, the potential difference causes an electrical current to flow from one side of the drill collar (e.g., upper side 82) through the borehole and subterranean formation to the other side of the drill collar (e.g., lower side 84). Such current flow through the formation (induced by the wound toroidal core antenna 90) and measurement thereof is the basis for certain prior art resistivity logging techniques.

Figure 1B:
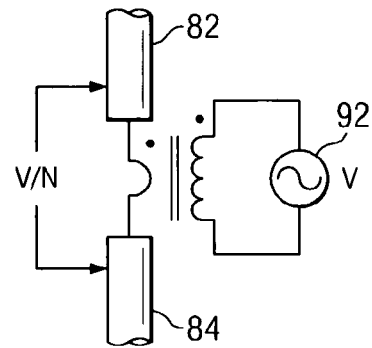
FIG. 1B depicts an electrical circuit representation of the prior art tool shown on FIG. 1A.

With further reference now to FIG. 1B, an electrical circuit representation of the prior art arrangement shown in FIG. 1A is illustrated. As described in the prior art, the combination of the wound toroidal core antenna 90 and drill collar 80, as shown in FIG. 1A, is essentially a N:1 stepdown transformer. Thus, when AC voltage source 92 (providing V volts) is coupled to the N-turn primary winding 96, a secondary voltage with a magnitude of V/N is induced between the upper 82 and lower 84 sides of the drill collar. The two sides 82 and 84 of the drill collar are approximately separate quasi-equipotential surfaces having a potential difference of V/N.

One possible alternative approach for providing a potential difference between upper and lower portions of a drill collar is to electrically isolate the two portions of the drill collar. For example, an electrical insulator may be deployed between the two portions of the drill collar and a voltage may be applied therebetween, for example via a conventional AC voltage supply. While such an approach is seemingly straightforward, it is not likely to provide a viable solution. Of particular significance, a drill collar having first and second portions separated by an electrical insulator is not rigid enough for downhole drilling applications owing to the relatively poor mechanical properties of conventional electrical insulators (as compared, for example, to stainless steel). Thus, another alternative approach is required in order to replace wound toroidal core antennas in certain downhole resistivity measurement tools.

Figure 2:
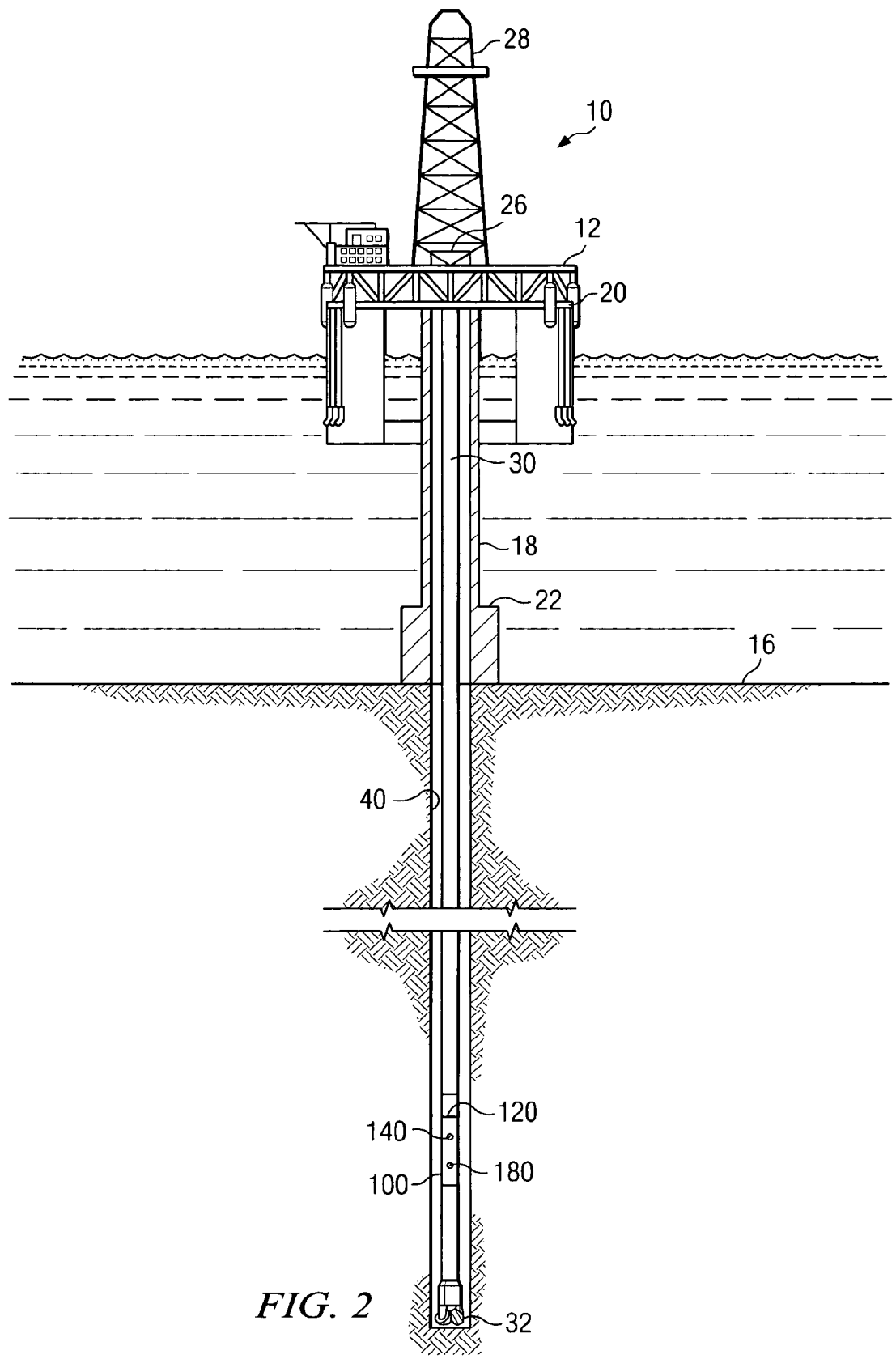
FIG. 2 is a schematic representation of an offshore oil and/or gas drilling platform utilizing an exemplary embodiment of the present invention.

Referring now to FIGS. 2 through 6, exemplary embodiments of the present invention are illustrated. FIG. 2 schematically illustrates one exemplary embodiment of a logging while drilling tool 100 in use in an offshore oil or gas drilling assembly, generally denoted 10. In FIG. 2, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and a measurement tool 100. Embodiments of LWD tool 100 include at least one magnetically permeable ring 120 deployed about the tool body 110 (FIG. 3A). Exemplary embodiments of LWD tool 100 may further optionally include (i) one or more electrodes 140 configured to locally measure the current flow between the tool body 110 and the formation and (ii) an azimuth sensor 180, which are advantageously longitudinally spaced from ring 120. Azimuth sensor 180 may include substantially any sensor that is sensitive to its azimuth on the tool 100 (e.g., relative to high side), such as one or more accelerometers, magnetometers, and/or gyroscopes. Drill string 30 may further include a downhole drill motor, a mud pulse telemetry system, and one or more other sensors, such as a nuclear logging instrument, for sensing downhole characteristics of the borehole and the surrounding formation.

It will be understood by those of ordinary skill in the art that the deployment illustrated on FIG. 2 is merely exemplary for purposes of describing the invention set forth herein. It will be further understood that the measurement tool 100 of the present invention is not limited to use with a semisubmersible platform 12 as illustrated on FIG. 2. Measurement tool 100 is equally well suited for use with any kind of subterranean drilling operation, either offshore or onshore.

In the embodiment shown on FIG. 2, azimuth sensor 180 is longitudinally spaced from and deployed at substantially the same azimuthal (circumferential) position as the electrode 140. It will be appreciated that this invention is not limited to any particular layout (positioning) of the electrode(s) 140 and the azimuth sensor(s) 180 on the tool 100. For example, in an alternative embodiment (not shown) electrode 140 and an azimuth sensor 180 may be deployed at substantially the same longitudinal position. Moreover, it will also be appreciated that this invention is not limited to any particular number of electrodes 140 and/or azimuth sensors 180. Furthermore, as described in more detail below, certain exemplary methods of this invention do not rely on azimuth measurements or electrode measurements and hence do not require a downhole tool having an azimuth sensor or an electrode.

Figure 3A:
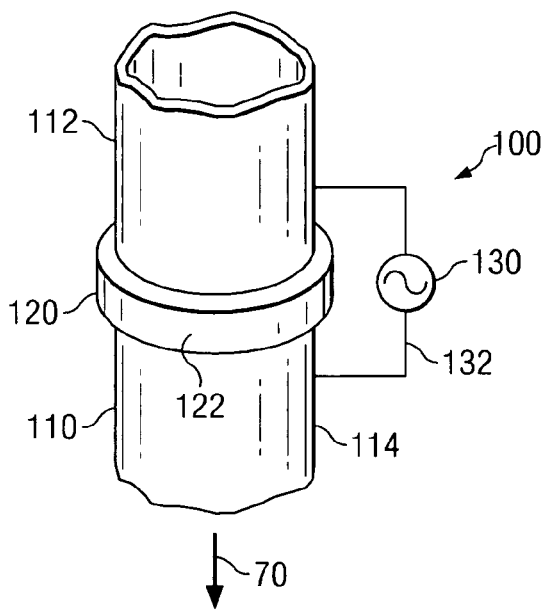
FIG. 3A is a schematic representation of a portion of a downhole tool according to the present invention.

Referring now to FIG. 3A, a portion of one exemplary embodiment of LWD tool 100 from FIG. 2 is schematically illustrated. LWD tool 100 is typically a substantially cylindrical tool, being largely symmetrical about longitudinal axis 70. In the exemplary embodiment shown, magnetically permeable ring 120 is deployed about (external to) a substantially cylindrical conductive tool body 110 (e.g., a drill collar). The tool body is configured for coupling to a drill string (e.g., drill string 30 on FIG. 2) and therefore typically, but not necessarily, includes conventional threaded pin and box ends (not shown). An AC voltage supply 130 is electrically connected to the tool body 110 on opposing sides 112 and 114 of the magnetically permeable ring 120, with at least one connecting conductor 132 crossing the exterior (outer surface 122) of the ring 120. Such opposing sides are also referred to herein as upper 112 and lower 114 sides for clarity of exposition. It will be understood that the application is not limited by such terminology. Application of an AC current between the upper 112 and lower 114 sides of the tool body 110 induces a circumferential magnetic flux in the ring 120. The magnetic flux in turn decreases the admittance (i.e., increases the impedance) between the upper 112 and lower 114 sides of the tool body 110, which enables an AC potential difference to be supported therebetween.

Figure 3B:
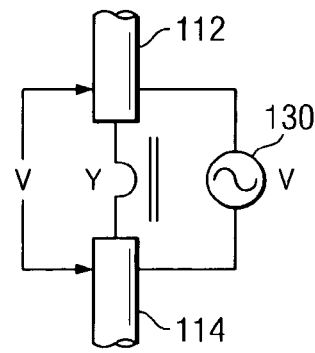
FIG. 3B depicts an electrical circuit representation of the tool shown on FIG. 3A.

With further reference now to FIG. 3B, an electrical circuit representation of the exemplary embodiment shown in FIG. 3A is illustrated. AC voltage source 130, having an AC voltage of V volts, is electrically connected to upper 112 and lower 114 sides of the tool body 110 with one of the conductors routed exterior to the magnetically permeable ring 120 (as shown on FIG. 3A). As described above, the applied AC voltage induces a magnetic flux in the ring 120, which in turn reduces the admittance Y of the tool body between the upper 112 and lower sides 114. Such a reduction in admittance Y enables the tool body to support an AC voltage difference of V volts between the upper 112 and lower 114 sides. While the admittance of the tool body 110 may be significantly reduced, it is not reduced to zero. Therefore, a current of V·Y will flow in the tool body 110 between the upper 112 and lower 114 sides thereof.

It will be appreciated that in the configuration shown on FIG. 3A (and also on FIGS. 4 and 6 as described in more detail below) the magnetically permeable ring 120 increases the inductance of the portion of the tool body 110 located internal to the ring 120, thereby converting the otherwise conductive tool body 110 into an inductor. The impedance of such an inductor (the portion of the tool body located internal to the ring 120) is substantially proportional to the both the frequency of the AC voltage source 130 and the magnetic permeability of the ring 120. As described in more detail below (and as shown on FIG. 5A), multiple rings, each having a high magnetic permeability, may be used to increase the inductance (and impedance) of the tool body and therefore to reduce current flow in the tool body 110 between the upper 112 and lower 114 sides.

With reference again to FIG. 3A, it is generally advantageous to configure LWD tool 100 so that the admittance between the upper 112 and lower 114 sides of the tool body is reduced (i.e., the impedance is increased) as much as possible in order to decrease current flow in the tool body 110 between the upper 112 and lower 114 sides. This may be accomplished, for example, by utilizing a magnetically permeable ring 120 having a high magnetic permeability. While a magnetically permeable ring 120 having substantially any suitable magnetic permeability may be utilized, one having a relative magnetic permeability of greater than about 10,000 is preferred. In such preferred embodiments, magnetically permeable ring 120 may be fabricated from, for example, Supermalloy, Amorphous Alloy E, and Permalloy 80 (available from Magnetics, Inc.) and Metglas® 2714A and Metglas® 2605 (available from Allied-Signal). Increasing the number of magnetically permeable rings 120 deployed about tool body 110 and the physical dimensions thereof (i.e., the radial thickness and longitudinal width of the rings 120) also tends to decrease the admittance between the opposing sides 112 and 114 of the tool body 110 by increasing the magnetic flux in the ring 120. However, it will be appreciated that in many applications there may be a tradeoff between a desire to further lower the admittance (and therefore to use more and larger rings 120) and a desire for a relatively compact tool. Nevertheless, this invention is not limited to the number and size of the magnetically permeable rings 120 deployed about the tool body 110.

Embodiments of this invention may utilize substantially any suitable power source 130. In one advantageous embodiment, power source 130 provides an AC voltage perturbation having a frequency in the range of from about 100 Hz to about 100 kHz and root mean square amplitude in the range of from about 50 mV to about 5 V. In general power source 130 is deployed inside the tool body (to protect it from the severe borehole environment) and is electrically connected to at least one conductor (e.g., conductor 132) routed about (exterior to) the magnetically permeable ring 120. It will be appreciated that power source 130 is not limited to a conventional sinusoidal AC voltage supply. Rather, substantially any power source providing substantially any AC voltage signal may be utilized. For example, an AC voltage signal having multiple frequencies may be utilized (e.g., square wave, triangular wave, etc.). Moreover, in some embodiments it may be advantageous to utilize an AC voltage supply providing a plurality of distinct sinusoidal frequency components. In such an embodiment, the individual frequency components may be utilized, for example, to infer resistivity values of different portions of the formation.

Figure 3C:
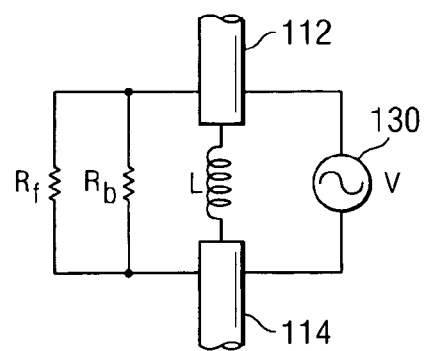
FIG. 3C depicts an exemplary electrical circuit representation of the tool shown on FIG. 3A deployed in a subterranean borehole.

With further reference now to FIG. 3C, another electrical circuit representation is illustrated in which LWD tool 100 is deployed in a subterranean borehole (such as borehole 40 shown on FIG. 2). As described above, AC voltage source 130 is electrically connected to upper 112 and lower 114 sides of the tool body, resulting in an AC potential difference therebetween. Depending upon the electrical characteristics of the subterranean borehole (e.g., the formation and the drilling fluid resistivities), such a potential difference may cause AC current to flow between the subterranean formation and the tool body. In the exemplary circuit representation shown, electrical current may traverse three parallel paths between the upper 112 and lower 114 sides of the tool body. A first path is through the tool body as represented by inductor L. As described above, it is generally desirable to minimize current flow through the tool body by increasing the inductance thereof. Second and third paths are through the borehole (the drilling fluid) and the formation. The resistors Rb and Rf represent borehole and formation impedances (which may also be referred to as apparent resistivities), respectively. To determine a local formation impedance (which is related to the formation resistivity), current flow between the borehole and tool body 110 is measured. As described in more detail below, one or more electrodes (such as electrode 140 shown on FIG. 2) may be utilized to measure current flow between the borehole and the tool body 110.

Figure 4:
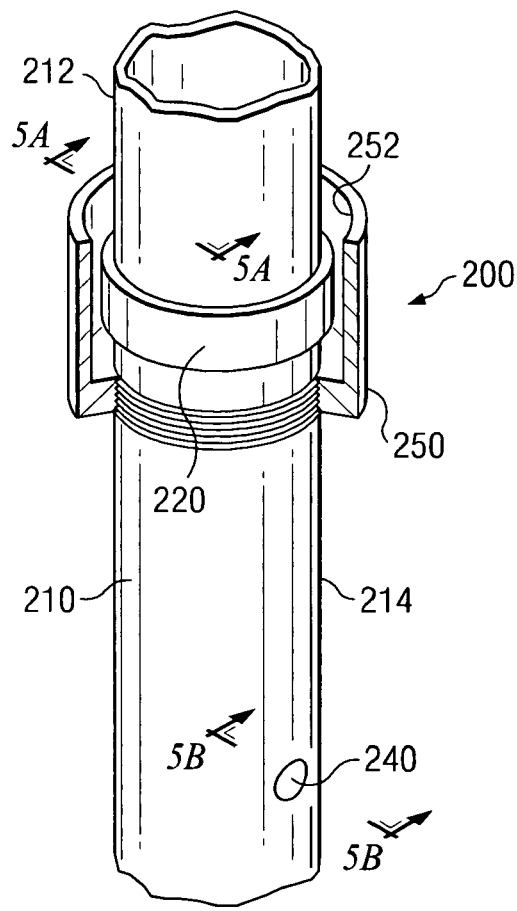
FIG. 4 depicts an exemplary embodiment of a downhole tool according to the present invention.

Turning now to FIG. 4, one embodiment of a measurement tool 200 according to principles of the present invention is illustrated. Measurement tool 200 includes at least one magnetically permeable ring 220 deployed about a substantially cylindrical tool body 210. An AC voltage supply (shown schematically at 230) is deployed in the tool body 110 and electrically connected to upper 212 and lower 214 portions of the tool body. It will be appreciated that voltage supply 230 may be deployed substantially anywhere in the tool 200 or elsewhere in the drill string.

Measurement tool 200 further includes a rigid sleeve 250 deployed about the magnetically permeable ring 220. The sleeve 250 is intended to physically protect the ring 220 from the abrasive drilling environment and collisions with the borehole wall. In the exemplary embodiment shown, sleeve 250 is threadably coupled to the lower portion 214 of the tool body 210, however, the invention is not limited in this regard. Physical protection for the ring 220 may be provided by substantially any additional and/or alternative means, such as via deployment of the ring 220 in a recess in the tool body 210 (as shown for example on FIG. 6). Sleeve 250 may also serve as an electrical conductor routed external to the magnetically permeable ring 220 (exterior to the outer surface of the ring 220), thus serving the same purpose as the conductor 132 shown on FIG. 3A. While the AC voltage supply 230 is shown schematically on FIG. 4, it will be appreciated that the voltage supply 230 is typically housed in the drill string (e.g., in tool body 210). Moreover, voltage supply 230 is typically electrically connected to an internal surface (not shown) of the upper portion 212 of the tool body 210. An electrical conductor may extend through a hole in the tool body and connect to an inner surface 252 of sleeve 250, thus completing the circuit shown on FIG. 3B.

Figure 5A:
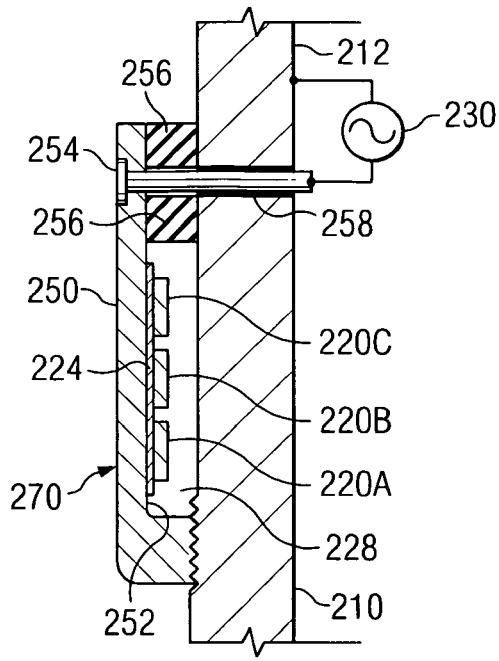
FIG. 5A depicts, in cross section, a portion of the embodiment of FIG. 4 showing an exemplary sleeve assembly deployed about the tool body.

Turning now also to FIG. 5A, one exemplary embodiment of a sleeve assembly 270 is shown in greater detail. In the exemplary embodiment shown, sleeve assembly 270 includes a sleeve 250 having an electrical insulating layer 224 (such as Teflon®) interposed between inner surface 252 and magnetically permeable rings 220A, 220B and 220C. It will be appreciated that insulating layer 224 is intended to prevent a short circuit between the sleeve 250 and the tool body 210 through one or more of the rings 220A, 220B, and 220C, and therefore may alternatively and/or additionally be interposed between the rings 220A, 220B, and 220C and the tool body 210. The sleeve assembly 270 further includes at least one conductor 254 that electrically connects the sleeve 250 to a terminal on A V voltage supply 230. Conductor 254 typically, although not necessarily, includes a rigid member such as a pin or bolt welded or threaded in place. Insulating material 258 serves to electrically isolate the pin 254 from the tool body 210. AC voltage supply 230 (shown schematically in FIG. 5A) is electrically connected to pin 254 and the upper portion 212 of the tool body 210. The sleeve assembly 270 may further include, for example, a washer 256 (or o-rings) interposed between the sleeve 250 and the tool body 210 to prevent contamination, such as drilling fluid and other downhole debris from entering annular cavity 228. Washer 256 may be fabricated, for example, from a Polyetheretherketone, such as PEEK™ (available from Victrex Corporation, Lancashire, UK). Annular cavity 228 may further be filled with an insulating material, such as an injectable silicon rubber, to provide further electrical insulation between sleeve 250 and tool body 210. Such a filler material may also provide vibration isolation for the magnetically permeable rings 220A, 220B, and 220C.

With reference again to FIG. 4, exemplary embodiments of measurement tool 200 further include one or more electrodes 240 deployed in and electrically isolated from the lower portion 214 of the tool body 210. Such electrodes may alternatively, or additionally, be deployed in the upper portion 212 of the tool body 210, and are intended to provide a segregated path for current flow between the formation and the tool body 210. The formation resistivity in a region of the formation generally opposing the electrode 240 may be determined via measurement of the AC current in the electrode 240. The apparent formation resistivity is inversely proportional to the current measured at the electrode 240. Assuming that the tool body is an equipotential surface, the apparent formation resistivity may be approximated mathematically by the equation: $R_f = V/I$, where V represents the voltage between the upper 212 and lower 214 sides of the tool body and I represents the measured current. It will be appreciated that various corrections may be applied to the apparent formation resistivity to compensate, for example, for borehole resistivity, electromagnetic skin effect, and geometric factors that are known to influence the measured current at electrode 240.

Figure 5B:
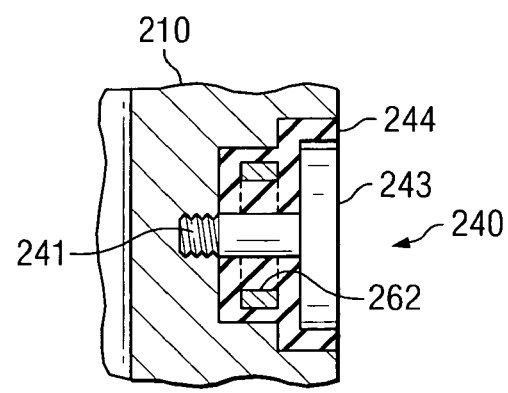
FIG. 5B depicts, in cross section, a portion of the embodiment of FIG. 4 showing an exemplary electrode deployed in a tool body.

With reference now to FIGS. 4 and 5B, one exemplary embodiment of electrode 240 is shown in more detail. Electrode 240 is mounted in an insulating material 244 such as a Viton® rubber (DuPont® de Nemours, Wilmington, Del.). Insulating material 244 serves to electrically isolate the outer surface (face 243 of the electrode 240 from the outer surface of the tool body 210. A neck portion 241 of the electrode may be threaded, for example, to the tool body 210 and thus electrically connected thereto.

In one embodiment, the electrode 240 is generally circular in shape (i.e., having a circular periphery), although the invention is not limited in this regard. Moreover, the electrode face 243 may include a generally cylindrical curvature to conform to the outer surface of the tool body 210 (e.g., to protect it from the borehole environment). Alternatively, the electrode 240 may include a flat face 243 that is slightly recessed in the tool body. Again the invention is not limited in regard to the shape of the electrode 240. In general the electrode 240 spans only a small fraction of the total circumference of the tool body 210 and thus may provide azimuthally sensitive resistivity measurements. Moreover, the electrode 240 also has a vertical extent that is a small fraction of the length of the tool 200 and thus may provide for axially sensitive (along the axis of the borehole) resistivity measurements. As such, in certain advantageous embodiments, the face 243 of the electrode 240 may have a diameter in the range of from about 1 to about 4 centimeters, which is large enough to provide sufficient signal (current) and small enough to provide the desired vertical and azimuthal resolution. However, the invention is not limited by the size of the electrode 240.

With continued reference to FIGS. 4 and 5, a conventional current measuring transformer 262 may be deployed about neck portion 241 and utilized to measure the AC current in the electrode 240. Such an arrangement advantageously functions as a very low impedance ammeter. It will be appreciated that substantially any other suitable arrangement may be utilized to measure the AC current in the electrode 240. For example, a current sampling resistor (preferably having a resistance significantly less than the sum of the formation and borehole resistances) may be utilized in conjunction with a conventional voltmeter. Alternatively, a Hall effect device or other similar non-contact measurement may be utilized to infer the current flowing in the electrode via measurement of a magnetic field. In still another alternative embodiment, a conventional operational amplifier and a feedback resistor may be utilized. Nevertheless, it will be appreciated that this invention is not limited by any particular technique utilized to measure the electrical current in the electrode(s).

In use, measurement tool 200 is typically coupled to a drill string and rotated in a borehole. The AC current may be, for example, continuously measured at electrode 240 and averaged over some predetermined sampling interval (e.g., 10 milliseconds). The duration of each sampling interval is preferably significantly less than the period of the tool rotation in the borehole (e.g., the sampling interval may be about 10 milliseconds, as stated above, while the rotational period of the tool may be about 0.5 seconds). Meanwhile, an azimuth sensor (such as azimuth sensor 180 shown on FIG. 2) measures the azimuth at the electrode 240, as the tool rotates in the borehole. The average current in each sampling interval may then be utilized to calculate a local formation resistivity at a particular azimuth. The azimuth is preferably measured at each sampling interval, or often enough so that the azimuth of the tool may be determined for each resistivity value, although the invention is not limited in this regard.

It will be appreciated that such azimuthally sensitive resistivity measurements may be utilized to form a two-dimensional image of the formation resistivity versus the azimuthal position in the borehole and the well depth. To form a two dimensional image (azimuthal position versus well depth), resistivity measurements may be acquired at a plurality of well depths using substantially any suitable procedure. For example, in one exemplary embodiment, azimuthally sensitive resistivity data may be acquired substantially continuously as described above during at least a portion of a drilling operation. Such resistivity data may be grouped by time (e.g., in 10 second intervals) with each group indicative of a single well depth. At a drilling rate of about 60 feet per hour, a 10 second interval represents about a two-inch depth interval. In certain imaging applications it may be advantageous to utilize conventional false color rendering or gray-scale rendering of the resistivity measurements. It will be appreciated that this invention is not limited to any particular sampling intervals and/or time periods. Nor is this invention limited by the description of the above exemplary embodiments.

It will be appreciated that exemplary embodiments of measurement tool 200 may include a plurality of electrodes 240 deployed about the periphery of the tool 200. Such embodiments may advantageously enable azimuthally sensitive resistivity measurements to be made about the circumference of the borehole without rotation of the drill string. Moreover, when used with a rotating drill string, such embodiments may advantageously provide for redundancy as well as reduced system noise accomplished via data averaging at each of the electrodes at each azimuthal position about the circumference of the borehole.

Exemplary embodiments of measurement tool 200 may also include two or more electrodes 240 deployed at substantially the same azimuthal position but longitudinally offset from one another (e.g., shown as electrodes 340A, 340B, and 340C on FIG. 6 described in more detail below). In such embodiments, the electrode(s) that are located farther from the magnetic rings 220 are expected to provide resistivity measurements that tend to be respectively deeper into the subterranean formation than electrode(s) that are located nearer to the rings 220. Such longitudinal electrode spacing may then advantageously provide for vertically resolved resistivity at multiple depths of investigation. Again, as stated above, this invention is not limited to any particular electrode spacing.

Moreover, it will further be appreciated that this invention is not limited to the use of an electrode or an azimuth sensor. For example, exemplary embodiments of this invention may include a conventional toroidal receiver deployed about the upper 212 and/or the lower 214 portion of the tool body 210. In such embodiments, the combination of the magnetic ring(s) and the voltage supply coupled to upper and lower ends of the tool body take the place of the conventional toroidal transmitter. The toroidal receiver may be utilized to measure current flow in the tool body and hence to determine a non-azimuthally sensitive formation resistivity.

Figure 6:
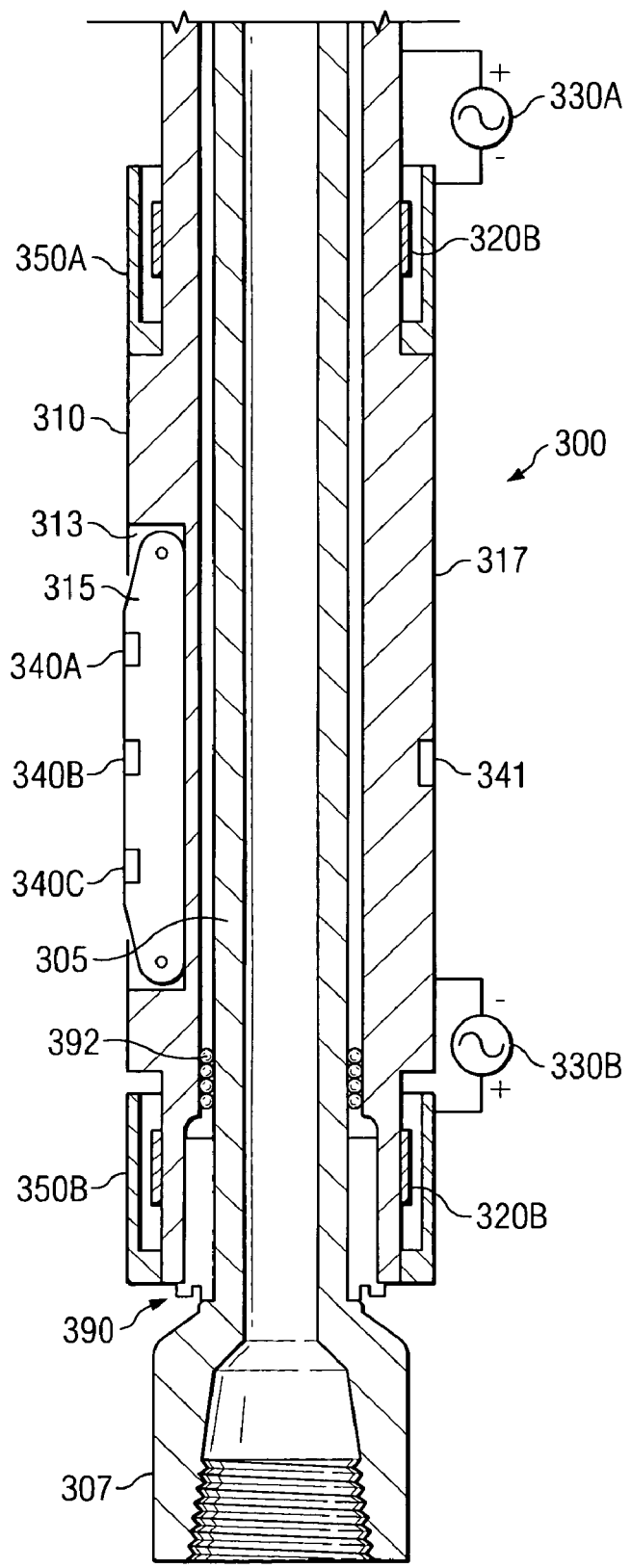
FIG. 6 depicts an alternative embodiment of a downhole tool according the present invention.

Referring now to FIG. 6, another alternative embodiment of a measurement tool 300 according to the principles of this invention is shown. In the exemplary embodiment shown, measurement tool 300 is configured as a downhole steering tool, such as a three-dimensional rotary steerable tool. Measurement tool 300 includes a tool body 310 and at least one blade 315 deployed, for example, in a recess 313 in the tool body 310. The tool body 310 is configured to be substantially non-rotating (with respect to the borehole) and is typically deployed about a rotating shaft 305, which transfers torque to a drill bit (e.g., coupled to rotating shaft 305 at drill bit receptacle 307). Tool 300 may thus incorporate one or more sealing assemblies 390 and bearing assemblies 392 deployed between shaft 305 and tool body 310. The blade(s) 315 are configured to extend outward from the tool body 310 (in a direction substantially perpendicular to the longitudinal axis of the tool), for example, into contact with a borehole wall.

With continued reference to FIG. 6, measurement tool 300 includes first and second longitudinally spaced magnetically permeable rings 320A and 320B deployed about tool body 310. First and second sleeves 350A and 350B are deployed about the corresponding first and second magnetically permeable rings 320A and 320B to both protect the rings 320A and 320B and to provide an electrically conductive path external thereto as described above with respect to FIG. 4. A first AC voltage supply (shown schematically at 330A) is coupled to sleeve 350A and the tool body 310 while a second AC voltage supply (shown schematically at 330B) is coupled to sleeve 350B and the tool body 310. In the embodiment shown, AC voltage supplies 330A and 330B are configured with opposing polarities, for example, such that sleeve 350A is coupled to the negative terminal of voltage supply 330A, while sleeve 350B is coupled to the positive terminal of voltage supply 330B or visa versa. Such a configuration including first and second magnetically permeable rings 320A and 320B and corresponding voltage supplies 330A and 330B having opposing polarities tends to advantageously provide a highly equipotential surface in the region 317 of the tool body 310 located between the rings 320A and 320B. While first and second voltages supplies are shown schematically in FIG. 6, the artisan of ordinary skill will readily recognize that a single voltage supply may also be used. For example, a first terminal of the voltage supply may be electrically connected to the tool body at a location between the magnetically permeable rings and a second terminal of the voltage supply may be electrically connected to each of the ends of the tool body.

Exemplary embodiments of measurement tool 300 further include a plurality of electrodes 340A, 340B, 340C, and 341. In the exemplary embodiment shown, at least one blade 315 (e.g., out of three blades in an exemplary rotary steerable tool embodiment) includes three longitudinally spaced electrodes 340A, 340B, and 340C. As described above, such longitudinal spacing of the electrodes 340A, 340B, and 340C may advantageously enable vertically resolved resistivity measurements to be acquired at multiple depths of investigation. Moreover, deployment of the electrodes 340A, 340B, and 340C on a stabilizer or steering tool blade 315 may advantageously reduce the effects of the borehole (e.g., the drilling fluid resistivity) on the formation resistivity measurements (e.g., by enabling the electrodes 340A, 340B, and 340C to be located in close proximity to or even in contact with the borehole wall during measurement). It will be appreciated that additional electrodes 341 may also be located directly on the tool body 310 (e.g., between the blades 315). Since tool body 310 is configured to be substantially non-rotating relative to the borehole in the embodiment shown, it may be advantageous to include a plurality of electrodes about the periphery of the tool to acquire azimuthally sensitive resistivity measurements. For example, such electrodes may be deployed on each blade (e.g., each of three or four blades on a typical steering tool) and/or at one or more azimuthal positions on the tool body between blades.

It will be understood that while not shown in the FIGS. 2 through 6, embodiments of this invention may include an electronic controller. Such a controller may include, for example, a programmable processor, such as a microprocessor or a microcontroller, volatile or non-volatile memory, and/or a data storage device. The controller may also include processor-readable or computer-readable program code embodying logic, including instructions for controlling the function of the AC voltage supply(ies) and/or measuring AC current in the electrode(s). A suitable processor may be further utilized, for example, to determine formation resistivity based on measured electrode current. Such resistivity values may be stored in memory (e.g., in the controller) and/or transmitted to the surface.

It will be appreciated that the above described AC voltage supplies (e.g., voltage supplies 330A and 330B shown in FIG. 6) may be incorporated into a suitable controller. Such a controller may include, for example, conventional electrical drive electronics for applying a voltage waveform (e.g., having a plurality of distinct sinusoidal components) to the tool body. The controller may further include a current limiting mechanism for preventing excessive currents in the event that one or more of the magnetic permeable rings are damaged or fractured during operations. A suitable controller may also include receiving electronics, such as a variable gain amplifier for amplifying the electrode current signals. The receiving electronics may also include various filters (e.g., low and/or high pass filters), rectifiers, multiplexers, and other circuit components for processing electrode current signals.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a depth detection sensor and/or an accelerometer, gyro or magnetometer to detect azimuth and inclination. A suitable controller may also optionally communicate with other instruments in the drill string, such as telemetry systems that communicate with the surface. The artisan of ordinary skill will readily recognize that a suitable controller may be deployed substantially anywhere within the measurement tool or at another suitable location in the drill string.

Although the present invention and its advantages have been described in detail, it should be understood that various changes, substitutions and alternations can be made to the embodiments set forth herein without departing from the spirit and scope of the invention as defined by the appended claims.

I claim:

1. A logging while drilling resistivity tool comprising:
   a substantially cylindrical, electrically conductive tool body including first and second longitudinally opposed ends, the tool body disposed to be operatively coupled with a drill string and deployed in a subterranean borehole such that the logging while drilling tool may acquire resistivity measurements without removing the drill string from the borehole;
   at least one magnetically permeable ring deployed about the tool body between the first and second longitudinally opposed ends thereof;

an AC voltage supply electrically connected to the first and second ends of the tool body with at least one connecting conductor deployed exterior to an outer surface of the magnetically permeable ring; and
a receiver.

2. The logging while drilling tool of claim 1, wherein the magnetically permeable ring has a relative permeability of greater than about 10,000.

3. The logging while drilling tool of claim 1, wherein the receiver comprises at least one electrode deployed in an outer surface of the tool body, an outer surface of the electrode electrically isolated from the outer surface of the tool body.

4. The logging while drilling tool of claim 3, wherein the receiver comprises a plurality of electrodes longitudinally spaced along the tool body.

5. The logging while drilling tool of claim 3, wherein the receiver comprises a plurality of electrodes circumferentially spaced about the tool body.

6. The logging while drilling tool of claim 1, wherein the at least one connecting conductor comprises a rigid member deployed about the magnetically permeable ring, the voltage supply being connected to the second end of the tool body via the member, the member providing an electrically conductive path exterior to an outer surface of the magnetically permeable ring.

7. The logging while drilling tool of claim 1, wherein the magnetically permeable ring is deployed in a recess in an outer surface of the tool body.

8. The logging while drilling tool of claim 1, wherein the receiver comprises a toroidal receiver deployed about the tool body, the toroidal receiver including an electrical conductor wound about a magnetically permeable toroidal core.

9. A logging while drilling tool comprising:
a substantially cylindrical, electrically conductive tool body including first and second longitudinally opposed ends;
at least one magnetically permeable ring deployed about the tool body between the first and second longitudinally opposed ends thereof;
an AC voltage supply electrically connected to the first and second ends of the tool body with at least one connecting conductor deployed exterior to an outer surface of the magnetically permeable ring;
at least one current sensing electrode deployed in an outer surface of the tool body.

10. The logging while drilling tool of claim 9, comprising a plurality of current sensing electrodes longitudinally spaced along the tool body.

11. The logging while drilling tool of claim 9, comprising a plurality of current sensing electrodes circumferentially spaced about the tool body.

12. The logging while drilling tool of claim 9, wherein:
a neck portion of the current sensing electrode is mechanically and electrically connected to the tool body; and
an outer surface of the current sensing electrode is electrically isolated from the outer surface of the tool body.

13. The logging while drilling tool of claim 12, further comprising a current measuring transformer deployed about the neck portion of the current sensing electrode.

14. A logging while drilling tool comprising:
a substantially cylindrical, electrically conductive tool body including first and second longitudinally opposed ends;
at least one magnetically permeable ring deployed about the tool body between the first and second longitudinally opposed ends thereof;
an electrically conductive, rigid sleeve deployed about the magnetically permeable ring;
an AC voltage supply electrically connected to the first end of the tool body and the sleeve;
at least one electrode deployed in an outer surface of the tool body, an outer surface of the electrode electrically isolated from the outer surface of the tool body; and
at least one current measurement module disposed to measure electrical current in the electrode.

15. The logging while drilling tool of claim 14, wherein the sleeve is threadably coupled with the tool body.

16. The logging while drilling tool of claim 14, further comprising an insulating layer deployed between the magnetically permeable ring and at least one of the tool body and the sleeve.

17. The logging while drilling tool of claim 14 wherein the magnetically permeable ring is deployed in the sleeve.

18. The logging while drilling tool of claim 14, wherein the magnetically permeable ring is deployed in a recess in the tool body.

19. The logging while drilling tool of claim 14, comprising a plurality of electrodes longitudinally spaced along the tool body.

20. The logging while drilling tool of claim 14, comprising a plurality of electrodes circumferentially spaced about the tool body.

21. A logging while drilling tool comprising:
a substantially cylindrical, electrically conductive tool body including first and second longitudinally opposed ends;
longitudinally spaced first and second magnetically permeable rings deployed about the tool body, a central region of the tool body located between the first and second magnetically permeable rings;
at least one AC voltage supply disposed to provide an AC voltage difference between the central region of the tool body and the longitudinally opposed ends of the tool body with at least one connecting conductor deployed exterior to an outer surface of each of the rings;
at least one electrode deployed in an outer surface of the central region of the tool body, an outer surface of the electrode electrically isolated from an outer surface of the tool body; and
at least one current measurement module disposed to measure electrical current in the electrode.

22. The logging while drilling tool of claim 21, wherein a first terminal of the voltage supply is electrically connected to the central region of the tool body and a second terminal of the voltage supply is electrically connected to each of the first and second ends of the tool body.

23. The logging while drilling tool of claim 21, comprising first and second AC voltage supplies, the first AC voltage supply electrically connected to the first end and the central region of the tool body, at least one connecting conductor between the first end and the central region of the tool body deployed external the first magnetically permeable ring, the second AC voltage supply electrically connected to the second end and the central region of the tool body, at least one connecting conductor between the second end and the central region of the tool body deployed external to the second magnetically permeable ring.

24. The logging while drilling tool of claim 21, further comprising first and second rigid sleeves deployed about the corresponding first and second magnetically permeable rings.

25. An inductive choke for a logging while drilling tool, the inductive choke comprising:

an electrically conductive drill collar;

an electrically conductive, rigid sleeve mechanically and electrically coupled to the drill collar, the rigid sleeve deployed about an outer surface of the drill collar; and a magnetically permeable ring deployed about an outer surface of the drill collar, the magnetically permeable ring deployed radially between an inner surface of the sleeve and the outer surface of the drill collar.

26. The inductive choke of claim 25 further comprising an AC voltage supply electrically connected to the drill collar and the sleeve.

27. The inductive choke of claim 25, further comprising an electrical insulating layer deployed radially between the magnetically permeable ring and at least one of the drill collar and the sleeve.

* * * * *